United States Patent [19]

Hadcroft

[11] 4,096,850
[45] Jun. 27, 1978

[54] HEAT ABSORBER FOR A SOLAR HEATING SYSTEM

[76] Inventor: John Mackay Hadcroft, 190 Waimunu Rd., Massey, New Zealand

[21] Appl. No.: 660,890

[22] Filed: Feb. 24, 1976

[30] Foreign Application Priority Data

Feb. 24, 1975  New Zealand .................. 176740

[51] Int. Cl.$^2$ .................................................. F24J 3/02
[52] U.S. Cl. ................................... 126/271; 237/1 A
[58] Field of Search ................... 126/270, 271; 5/365;
237/1 A; 203/DIG. 1; 202/208

[56] References Cited

U.S. PATENT DOCUMENTS

| 1,382,831 | 6/1921 | Hilker | 5/365 |
|---|---|---|---|
| 3,076,450 | 2/1963 | Gough et al. | 126/271 |
| 3,077,190 | 2/1963 | Allen | 126/271 |
| 3,397,117 | 8/1968 | Smith et al. | 126/271 |
| 3,415,719 | 12/1968 | Telkes | 126/271 |
| 3,513,828 | 5/1970 | Masters | 126/271 |
| 4,003,365 | 1/1977 | Weigand et al. | 126/271 |

Primary Examiner—John J. Camby
Assistant Examiner—Larry I. Schwartz
Attorney, Agent, or Firm—Ladas, Parry, Von Gehr, Goldsmith & Deschamps

[57] ABSTRACT

In one aspect, the present invention consists in a heat absorber for a solar heating system, said absorber including a support member, a flexible heating bag having inlet and outlet connections and arranged to be supported in use by said support member, and a retaining member positioned in use on the opposite side of said bag from said support member so as to control the depth of said heating bag therebetween when said heating bag is filled with fluid, said retaining member being adapted to allow at least a substantial portion of the face of said heating bag adjacent thereto to be exposed to sunlight in use.

8 Claims, 3 Drawing Figures

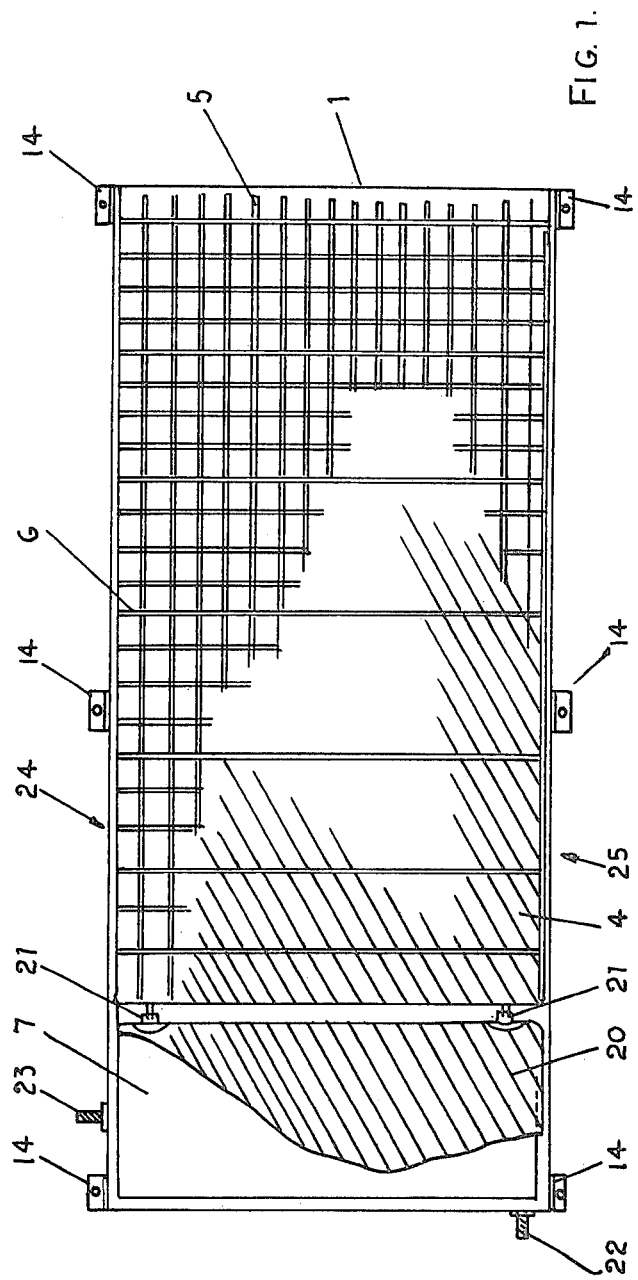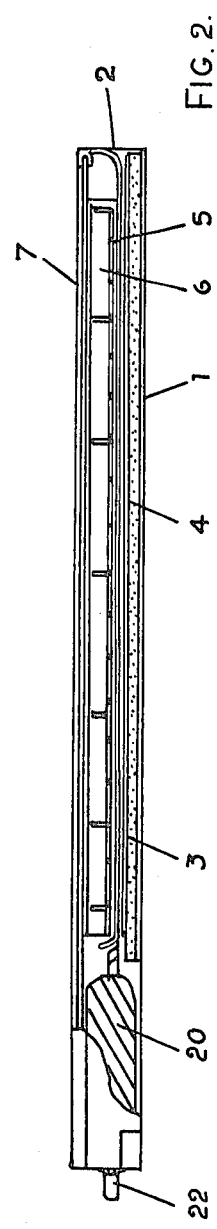

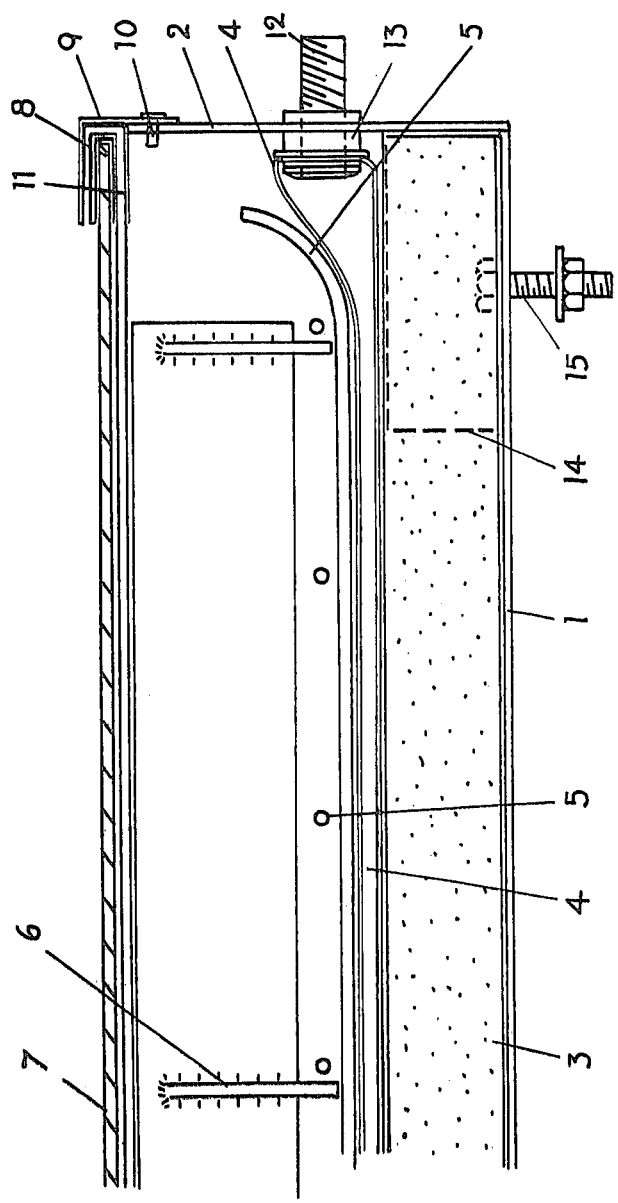

HEAT ABSORBER FOR A SOLAR HEATING SYSTEM

This invention relates to heaters and has been devised particularly though not solely as a heat absorber for a solar water heating system.

In the past heat absorbers for solar water heating systems have been expensive to manufacture owing to the cost of the materials (e.g. copper and stainless steel) involved, and the amount of time taken to fabricate the absorber. These factors have made conventional solar heat absorbers too costly for their capital saving and hot water power usage in most applications. Heat absorbers manufactured from conventional rigid material also have the disadvantage that they are prone to damage due to ice formation in heavy frost areas and the heat absorbers with conventional passage type circulation also have problems with corrosion, formation of air locks and poor water circulation characteristics.

It is therefore an object of the present invention to provide a heat absorber for a solar water heating system which will obviate or minimise the foregoing disadvantages in a simple yet effective manner or which will at least provide the public with a useful choice.

Accordingly in one aspect the invention consists in a heat absorber for a solar heating system, said absorber including a support member, a flexible heating bag having inlet and outlet connections and arranged to be supported in use by said support member, and a retaining member positioned in use on the opposite side of said bag from said support member so as to control the depth of said heating bag therebetween when said heating bag is filled with fluid, said retaining member being adapted to allow at least a substantial portion of the face of said heating bag adjacent thereto to be exposed to sunlight in use.

In a further aspect the invention consists in a solar heating system comprising a heat absorber according to the preceeding paragraph and a storage bag adapted to hold fluid heated in said heating bag, said storage bag being located adjacent said heating bag and connected thereto by said inlet and outlet connections.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

The invention consists in the foregoing and also envisages constructions of which the following gives examples only.

One preferred form of the invention will now be described with reference to the accompanying drawings in which, FIG. 1 is a plan view of a solar heat absorber according to the invention showing portions of the heat absorber removed for clarity of detail, FIG. 2 is a cross sectional view of the solar heat absorber shown in FIG. 1, and, FIG. 3 is a cross sectional view to an enlarged scale of a portion of the solar heat absorber shown in FIGS. 1 and 2.

In the preferred form of the invention a heat absorber for a solar water heating system is constructed as follows.

A support member is provided in the form of a metal tray 1 formed in the preferred embodiment of the invention from 24 gauge galvanised steel and having upturned edges 2 adapted to support the remaining components of the absorber as will be described further later. Inside the tray is placed a layer of heat insulating material 3 which may be any known conventional insulating material, for example glass fibres or a cork compound or any form of foamed plastics material, but which is preferably a slab of a rigid styrene foam. In the embodiment of the invention shown in the accompanying drawings the thickness of the insulation is typically 1 inch. A flexible heating bag 4 is provided and placed on top of the insulating slabs so that the insulating slab forms a part of the supporting member for the bag, the bag being formed from a rubber material or a synthetic rubber-like material or a rubberised fabric but preferably from the synthetic rubber known as a butyl rubber or by the trade name "Butynol". The bag has a length and a width considerably greater than the height of the bag e.g. the length and width of the bag are sized to fit within the tray 1 and the height of the bag in use is approximately ¼ inch. The thickness of the material forming the bag is preferred to forty thousandths of an inch. The heating bag is held in place in the mounting frame 1 against the insulating slab 3 by a retaining member arranged so as to control the depth of the bag between the supporting member and the retaining member to the above mentioned ¼ inch. The retaining member is formed by a wire grid or grill 5 held in place against the pressure of water within the bag 4 by a support frame 6 placed above the wire grid, the support frame typically being formed by strips of steel plate welded together into a rectangular grid.

Above the support frame a transparent panel 7 is mounted on the upturned edges of the tray and in the preferred form of the invention the transparent panel takes the form of a ⅛ inch thick sheet of acrylic plastics material although it will be apparent that any other form of transparent panel could be used in this situation e.g. a sheet of glass. The transparent panel is mounted in a rubber seal 8 placed around the periphery of the panel and held in place by way of "L" shaped clips 9 rivetted by way of rivets 10 to the upturned edges of the tray. The support frame 6 is fabricated so that along the edges of the tray the edges members of the support frame abut the lower surface of the turned over edge 11 of the tray so locating the frame 6 within the tray 2 so as to retain the bag 4 at a height determined by the space of the wire mesh 5 from the insulating slabs 3.

The bag 4 is provided with inlet and outlet connections 12 arranged in use on the upper and lower edges of the bag as will be described further later, the inlet and outlet connections preferably taking the form of a threaded pipe engaged with the bag by way of washers and lock nuts 13.

The tray is provided with mounting brackets 14 placed as required around the periphery of the tray and adapted to receive mounting bolts 15 so that the tray may be secured to a mounting structure by way of the mounting bolts.

In use the heat absorber is mounted on a supporting structure (not shown) so as to be orientated at an angle to the horizontal in order to use the maximum benefits from the insolation on the panel and arranged so that the inlet and outlet from the panel are located on the lower and upper edges respectively. Water is then supplied to the absorber by way of the inlet connection so that the bag 4 becomes filled with water the pressure in the bag being resisted by the wire mesh 5 backed by the support frame 6 and the insulating slab 3 so that the bag is retained at the height predetermined by the spacing of the wire mesh from the insulating slab. The outlet from the bag is connected to the hot water supply system and the system arranged with conventional solar heating plumbing so that cold water received through the lower inlet passes through the bag 4 where it is heated by the sunlight radiation passing through the transparent panel 7 and onto the upper surface of the bag 4 before the heated water issuing from the outlet at the upper edges of the bag. The heated water rises through the bag by the thermosyphon effect which is enhanced by the open nature of the bag i.e. there being no internal partitions within the bag. The transparent panel 7 provides the "glass house" effect retaining a large proportion of the radiant heat passing through the panel. The insulating slab 3 also assists in retaining the heat within the heat absorber by impeding the passage of heat through the lower surface of the tray 1.

A heat absorber for a solar water heating system constructed as above described is found to have the following advantages over conventional heat absorbers. The heat absorber according to invention has a higher water heating rate per square meter so enabling a reduction in panel size and cost for a given heating effect, and because there are no divisions or panels within the flexible bag an improved thermosyphon circulation is achieved within the heat absorber resulting in the elimination of air lock or corrosion problems commonly found in solar water heating absorbers. The unit is very light in weight compared with conventional heat absorbers and is very simple to instal in a desired location. Because of the use of an acrylic plastic sheet as the transparent panel, the heat absorber has better heat retention properties than heat absorbers having glass panels and this feature also renders the unit completely suitable for ground level use, e.g. around swimming pools, as there is no danger from broken glass.

In a further preferred embodiment of the invention it is envisaged that a solar absorber panel as above described may be incorporated with a further bag of butyl rubber material located in one end of the support frame 1, the further bag forming a storage bag 20 connected to the absorber panel by pipe connections 21. The storage bag is not retained to a predetermined height in the same manner as the heating bag so that the storage bag is allowed to fill out in height under pressure from water within the bag in order to retain a considerable quantity of heated water. As the storage bag is also placed within the frame 1 and beneath the transparent panel 7 the top surface of the storage bag is also collecting heat from the sun which increases the overall performance of the unit. Having the water storage within the unit itself reduces installation costs and eliminates the possible danger of leakages from conventional storage tanks which may occur with conventional systems causing ceiling and other interior damage. In this configuration of the invention the inlet to the system is provided to the storage bag adjacent to the lower edge of the bag as typically shown at 22 and the outlet from the system is provided at the upper edge of the bag through outlet 23. In use the edge 24 of the absorber is placed higher than the edge 25 so that the water within the storage bag 20 is being heated by the passage of water through the heating bag 4 by the thermosyphon effect, the water passing through the pipe connections 21.

I claim:

1. A heat absorber for a solar heating system, said absorber including a support tray, a flexible heating bag having inlet and outlet connections and arranged to be supported in use by said support tray, and a retaining grill or grid positioned in use on the opposite side of said bag from said support tray and engaging said bag so as to control the depth of said heating bag between said support tray and said retaining grill or grid when said heating bag is filled with liquid.

2. A heat absorber as claimed in claim 1 wherein said support tray incorporates upturned edges surrounding said heating bag, said retaining grill or grid being supported around the periphery thereof at said upturned edges.

3. A heat absorber as claimed in claim 1 wherein said support tray incorporates a layer of heat insulating material in the form of a sheet of foamed plastics material.

4. A heat absorber as claimed in claim 1 including a substantially transparent panel comprising a sheet of acrylic plastics material mounted a predetermined distance from said retaining grill or grid.

5. A heat absorber as claimed in claim 1 wherein said flexible heating bag is formed from a rubberised material comprising butyl rubber.

6. A solar heating system comprising a heat absorber as claimed in claim 1 and a storage bag adapted to hold fluid heated in said heating bag, said storage bag being located adjacent said heating bag and connected thereto by said inlet and outlet connections, yet being positioned beyond said retaining grill or grid.

7. A solar heating system as claimed in claim 6 wherein said support tray incorporates upturned edges surrounding said heating bag, and said storage bag is located within and supported by said tray, and wherein the heat absorber includes a substantially transparent panel mounted at said opposite side of the heating bag and covering the heating bag, and said storage bag is covered by said transparent panel.

8. A solar heating system as claimed in claim 6 wherein said storage bag is formed from a rubberised material comprising butyl rubber.

* * * * *